United States Patent [19]

Martin et al.

[11] 4,010,557
[45] Mar. 8, 1977

[54] MUSIC LABORATORY
[75] Inventors: Daniel W. Martin; Robert G. Morgan, both of Cincinnati, Ohio
[73] Assignee: D. H. Baldwin Company, Cincinnati, Ohio
[22] Filed: Apr. 27, 1971
[21] Appl. No.: 138,004

Related U.S. Application Data

[62] Division of Ser. No. 719,126, April 5, 1968, Pat. No. 3,595,120.
[52] U.S. Cl. .................................. 35/35 C; 35/5; 35/48 R; 84/470
[51] Int. Cl.² ........................................ G09B 19/04
[58] Field of Search ......... 179/1 B, 1 SW; 35/35 C, 35/5, 6, 8 R, 8 A, 48 R; 84/470; 200/11 D, 14

[56] References Cited
UNITED STATES PATENTS

| | | | |
|---|---|---|---|
| 2,821,580 | 1/1958 | Black | 200/14 |
| 3,177,594 | 4/1965 | Demo | 35/35 C |
| 3,200,516 | 8/1965 | Parker | 179/1 B |
| 3,217,428 | 11/1965 | Spaulding | 179/1 B |
| 3,470,785 | 10/1969 | Shallenberger | 84/470 |
| 3,475,833 | 11/1969 | Andersen | 84/470 |

OTHER PUBLICATIONS

Oak Distributor Switches, Catalog, 6/1/62, pp. 1–6.

Primary Examiner—Richard C. Pinkham
Assistant Examiner—Vance Y. Hum
Attorney, Agent, or Firm—Melville, Strasser, Foster & Hoffman

[57] ABSTRACT

A system of class intercommunication which provides:
1. individual channels between a teacher and
    a. any student of the class, or
    b. any of several preselected groups of students of the class, or
    c. the entire class.
2. provision for ensemble playing within one or more of the groups.
3. provision for group instruction from audio aids, all under control of the teacher only.

Programming is achieved by rotary group programming switches, which determine the character of the facilities, e.g., individual, audio aids, and ensemble, by interlocked group selection switches which enable selection of one group to the exclusion of the others, by further interlocked selection switches which enable selection of an individual student to be monitored or privately instructed, and by a switch which enables the teacher to provide any or all groups with instruction simultaneously. A minimum number of switch actuators is provided, physically grouped for easy access and control within the span of one hand.

8 Claims, 3 Drawing Figures

MUSIC LABORATORY

This is a division of application Ser. No. 719,126, filed Apr. 5, 1968, now U.S. Pat. No. 3,595,120.

BACKGROUND OF THE INVENTION

Language laboratories have been extensively employed for many years. More recently, some of the techniques heretofore applied to language training have been extended to the teaching of music. To this end musical instruments are employed, which produce electrical signals but are, or can be, silent acoustically. It is desirable for one instructor to instruct a large number of pupils, say 24, for example. For convenience these may be divided into four groups, identified as A, B, C, D, respectively, each of which includes six students. It is then required that the instructor be enabled to listen to any one student, that the student be enabled to hear the playing of the instructor, or music deriving from one or more external sources, and that two-way voice communication between the student and the instructor be available at the option of the teacher. Further the students may play in ensemble, by group, or groups and also an intercommunication facility must exist in the sense that the students within a group must hear each other, and the teacher may hear the students of any group. In one system known to us, this has led to provision of 16 push buttons and five three-position switches, on a control panel available to the instructor, and to a two position switch at each student position, for solution of the communication problem. These switches must be manipulated in various combinations, to achieve various of the desired communication objectives, and flexibility of end result is achieved by complexity of manipulation, which may be unacceptable to the many music instructors who are electronically unsophisticated. The present invention concerns itself with the provision of a simpler control system, arranged physically to facilitate manipulation by virtue of compactness of a switch actuator array, and psychologically to facilitate understanding of the available functions of the switches and how these may be achieved. The present invention relates to simplification of electrical switching circuitry, in achieving a wide variety of possible interconnections.

It is a feature of the system that all intercommunication functions are under control of the teacher, in the sense that no student is called upon to operate controls to effect group relationships. Moreover no student can elect to call the teacher while the teacher is engaged with another student. Another feature is that the total number of switching elements is reduced in the present system in comparison with the number required in other systems of class music instructions known to us, which simplifies wiring and operation and reduces maintenance problems.

SUMMARY OF THE INVENTION

An intercommunication between a teacher and (a) individual students of a class, (b) a group within the class, or (c) the entire class, coupled with provision for distributing audio signals from magnetic tape or record reproducers to groups of students, or to the class, and for ensemble playing by one or more groups. These functions are selectively accomplished, in the case of a four group class, by four four-position rotary switches and an array of 12 push buttons. One rotary switch applies to each group, and its four positions determine whether the group is programmed for individual instruction, for reception of recorded music derived from either of two recorders, or for ensemble playing. The push buttons enable selection of an individual of any group for private communication, selection of a group for group instruction with optional simultaneous monitoring of any individual within the group, or selection of one to four groups fo simultaneous instruction.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein.

DESCRIPTION OF THE PREFERRED EMBODIMENT

Figure 1A:
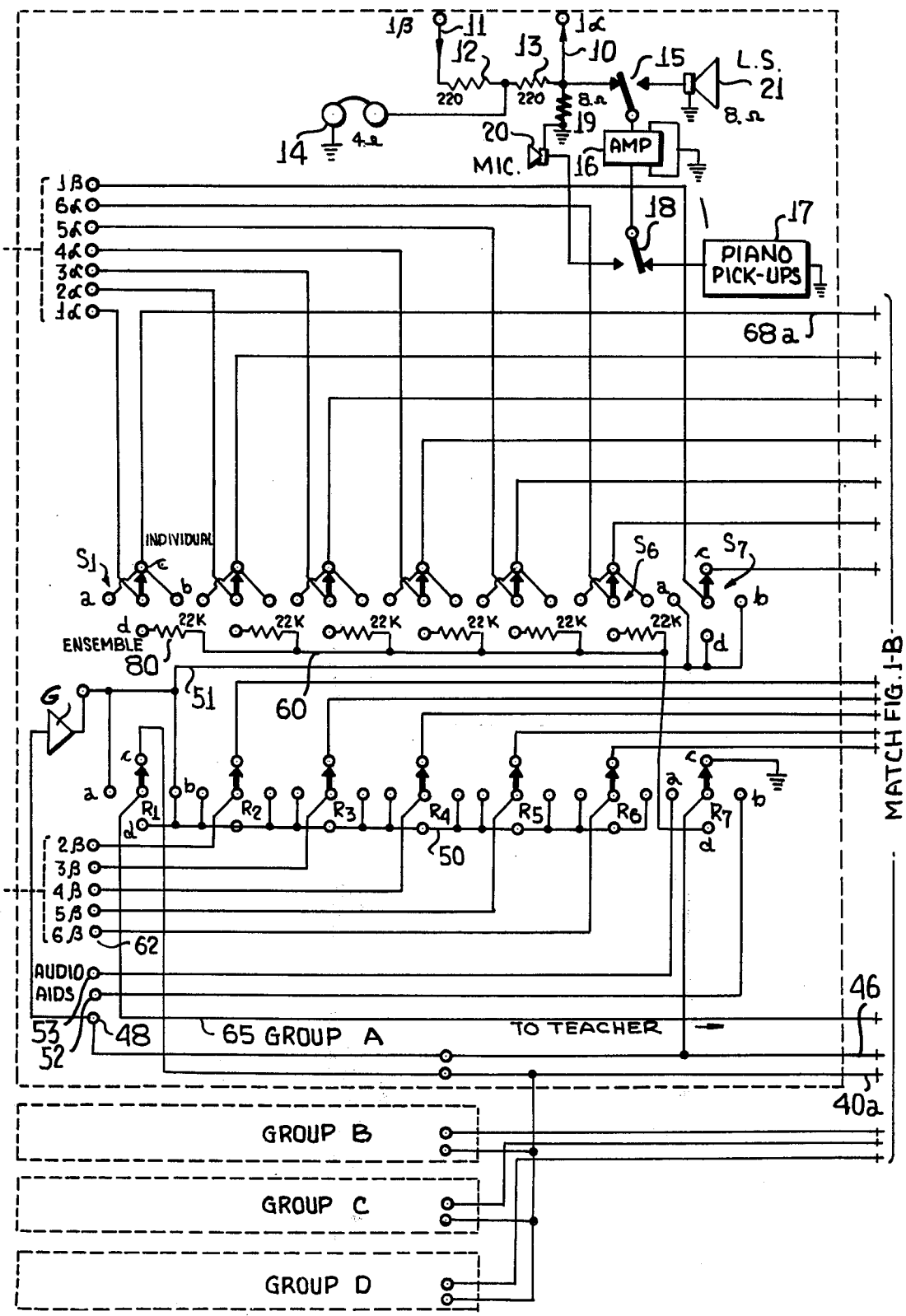
FIGS. 1A and 1B are circuit diagrams of a system according to the invention.

The present system is designed, in the preferred embodiment, to accommodate a class of 24 students, divided into four groups of six students per group. Each student is provided with an outgoing or $\alpha$ line, as 10, and an incoming of $\beta$ line 11. These proceed via isolating resistances 12, 13 to student headphones 14. The $\alpha$ line is connected via switch contacts 15 to a student amplifier 16 and electropiano pickups 17, or in the alternative, via switch 18, to the student's microphone 20. Accordingly, the student can provide either oral or piano signal, at will, to the outgoing or $\alpha$ line 10. The student can hear his own voice or piano in headphones 14, or may transfer these to a loudspeaker 21 via selective switch 15. Resistors 12, 13 isolate the $\alpha$ line from the $\beta$ line, so that signals incoming on the $\beta$ line 11 do not proceed out via the $\alpha$ line 10. The headphones 14 are connected between the junction of resistors 12, 13, so that the student may hear himself and/or incoming signals.

The teacher is provided with headphones 30 and with a microphone 31 and electropiano 32. The microphone 31 is connected through a preamplifier 33 to a teacher's power amplifier 36, to which the output of piano pickups 32 is connected at will. The output of preamplifier 33 is unaffected when switch 35 is connected to contacts 34, but is grounded by contact to 34a when the teacher is listening only, to minimize noise which might disturb the student. The output of teacher's amplifier 36 is connected to a line 40, which proceeds on to the several students, via switch 41, and which connects by alternate routes eventually to the teacher's headphone circuit. The teacher's headphone 30 is connected between the midpoint of isolating resistors $R_1$, $R_2$ and ground, and is thereby connected to the teacher's amplifier 36, or to the group amplifier G and to a selected student's $\alpha$ line.

The teacher can communicate with the entire class of 24 students, by depressing the class switch 43. Thereby a circuit is completed to contacts 44 and via resistances 45, to lines 46, 47, 48 and 49. These lines are associated, respectively, with switches relating respectively to groups of students, each group containing six students, and the groups being identified respectively as groups A, B, C, D. Only the switches of group A are illustrated. The arrangement is duplicated for the several groups, and is illustrated only once, to simplify the exposition. While the class switch 43 is depressed the teacher hears the output of teacher amplifier 36 via lines 40, 40b, and 40c.

Line 46 proceeds to amplifier input terminal 48, of amplifier G, specific to group A. Each group is provided with a separate group amplifier. We now desire that the teacher's signals proceed to all the students of the class. The rotary switch decks $R_1$, $R_2$, $R_3$, ... for each group are controlled by a single knob. If this knob is turned to its a, b or d position, the output of amplifier G then proceeds via line 50, line 51 and the a, b or d contact of switch deck $S_7$ to terminal line $1\beta$. Deck $R_2$ is connected to line $2\beta$, deck $R_3$ to line $3\beta$, and so on for the decks $R_4$, $R_5$ and $R_6$, connecting student headphone circuits to the group amplifier output. Deck $R_7$ is not connected to line 50, but is connected to audio aid terminals 52, 53, assumed not operative at this time. Similar reasoning applies to the switch decks of groups B, C and D, so that any selected group of students can now hear the teacher, each via a separate group amplifier line.

Two additional audio input lines are provided at 52 and 53, which are connected to the input of amplifier G, via $R_7$ and line 48. Lines 52 and 53 may be connected, respectively, to tape recorders or phonographs so that all the students may hear these, as described hereinafter. Also the d, or ensemble position of switches $S_7$ and $R_2$ to $R_6$ are all connected to lines 50 and 51, so that any selected group or groups of students can hear the teacher in this position.

There are therefore three positions (a, b, and d) of the RS switches for which the teacher can transmit to the entire class. In positions a, b or c a selected student can transmit to the teacher. In two of these positions, a and b, audio aids can be provided by the teacher. However, the RS switches illustrated are all controlled by one knob, and each group has a knob. It follows that, for example, group A can listen to one audio aid, group B to another audio aid and groups C and D to the teacher alone by setting the rotary switches for these groups. Switch $R_7$ serves to select input for group amplifier G from one of the audio aids, in its a a or b positions, and in its d position it selects the ensemble output of all the students of a group from line 60, which is connected through relatively high resistances 80 to all the $\alpha$ lines of the group.

If it is desired that the teacher transmit only to a selected group, the rotary switches R, S are again set to their a or b positions. Instead of closing class switch 43, one of group switches A, B, C, D is closed. Assume that switch A is closed. The signal now proceeds via contacts 60 only from switch 41. Signal proceeds to line 46, as before, and to the input of amplifier G, but not to lines 47, 48, 49, as in the case of class instruction. From line 46 signal proceeds only to the group amplifier G supplying signal to $1\beta$ - - - 6 lines of group A. Again this group can hear signal input to terminals 52 and 53, deriving from tape or disc reproduction devices, according to the setting of $R_7$. Audio terminals 52, 53 proceed to the a and b contacts of switch $R_7$, respectively, so that these may be selectively applied to the group, depending on whether the RS switches are in a or b positions, but the teacher can be connected to the group in either case when switch 41 is in "instruct" or "call" position.

For any group function of Group A, for example, the teacher hears her own voice and piano (only if switch 41 is operated in instruct or call) via line 40, contacts 60, line 46, group amplifier G, line 65, contact 66, and line 40c. By thus routing the teacher signals through the group amplifier to her headset, one insures that she hears herself over only one path while instructing a group.

Facility is provided for ensemble playing of all the instruments of a group. For this purpose, the RS switches are set to the d position. If the A group is selected for this purpose, the switching system must interconnect all the $\alpha$ lines with all the $\beta$ lines, and to the teacher when desired. The $1\alpha$ line now proceeds to switch $S_1 d$, and thence via line 60, which leads to contact $R_7 d$. The rotor $R_7$ connects to line 46, which leads to the input of amplifier G. The output of the amplifier G proceeds via line 51 and switch $S_7 d$ to line $1\alpha$. The output of amplifier G also proceeds to line 50, and the rotors of $R_2$, $R_3$, $R_4$, $R_5$, $R_6$, lead respectively to lines $2\beta$ to $6\beta$, respectively, while $R_1 d$ leads to line 65, contacts 66, line 40c and the teacher headphones 30. The teacher can then hear all the students of group A and they can hear each other.

The teacher can talk to the entire group, in the path 31 (her microphone), 33, 35, 36, amplifier line 40, switch 41, contact 60, line 46, to amplifier 48. The paths following the amplifier G have hereinabove been traced, and the description is not repeated.

For purpose of individual instruction the SR switches are set to position c. Assume the teacher desired to communicate with student Al, i.e., student No. 1 of group A. Switch 70 and switch A would be actuated. Line $1\alpha$ is now connected via contact $S_1 c$ to line 68a, contacts 61 and 70 and line 67 to the teacher's headphones. Note that this path contains no amplifier. The teacher's signal proceeds from amplifier 36 to switch 41, and thence to line 75, contacts 76, contacts 77, switch $S_7 c$, to line $1\beta$.

The system provides only one set of group selection and individual selection switches, so that one individual of any one group can be selected. Communication with the teacher then proceeds via the A, B, C and D group switches, and the individual switches 70. In such case the remaining groups not selected can play in ensemble or listen to audio aids, i.e, they can operate independently of the teacher.

The system of the invention requires a minimum of controls, assembled in a compact group, i.e., six "individual student" push buttons, 90, a "cancel" button 91 for these; four group buttons 92 and a "class" button 93, cancelling group buttons 92 and substituting class function, located immediately above the individual buttons on a panel 94, and four four-position group rotary switches 95 located above the corresponding group buttons. The rotary switches have an "ensemble" position, d, an "individual" position c, and two positions, a and b, dedicated to auxiliary audio input lines. The group buttons 92 select one group at a time, and the class button 93 selects all groups, actuation of a succeeding button resetting the previously set button. Only one group amplifier per group is required. Major controls are located within one rectangle, containing two rows of push-buttons and four rotary four-position switches, located symmetrically with respect to the push buttons. The only other controls involved are a speech level control 96 and a three-position switch 97, which can be set for Listen Only, Call or Instruct, at will. The switch 97 corresponds with switches 35, 41 of FIG. 1B.

The electropianos of the system all include powerful amplifiers, say 15 watts, so that the electropianos can play through loudspeakers, as 21, FIG. 1A, in which case they simulate the tones of acoustic pianos. The $\alpha$ lines therefore operate at a high audio potential, and this permits signal isolation to be accomplished by passive resistive circuits, and makes available enough signal so that each student can, in the class ensemble situation, transmit a considerable signal to all the 24 sets of headphones, and the teacher. The group amplifiers G act essentially as linear mixers, and are low power amplifiers, perhaps 5 watt. For example, in an ensemble condition, the $1\alpha$ line via $S_1d$ to a 22KΩ resistance 80 and thence via $R_7d$ to the input of amplifier G, and then back via $S_7d$ to line $1\beta$. 220Ω resistors 12 and 13 in combination with 4 ohm headphones 14 grounded on one terminal, isolate lines $1\beta$ and $1\alpha$.

The loudspeakers of the system have impedances of the order of 4–10 ohms, and the amplifiers driving these loudspeakers are capable of supplying to them several watts of power. In the headset mode of operation the output of the electropiano is fed to dummy load 19. The headsets in the system have impedances of only 4 ohms. For equivalent loudness to the listener the power required for a headset operating into a listener's ears is a very small fraction of the power supplied to the dummy load. The audio distribution lines of the system then supply power from a low impedance source to remote switching, mixing or heatset isolation resistors of considerably higher impedance. The headset isolation resistances, usually 220Ω are in series with the low headphone impedances, and a number of these may be connected in prallel across a dummy load. The power lost in the high resistances is not needed by the headphones, and hence power utilization efficiency is sacrificed for desirable operating characteristics. One of these is that as the number of headset loads on a given source varies, the potential across each headset load remains essentially the same.

It is possible, also, to mix signals to a headset from two or more audio power distribution circuits, e.g. an $\alpha$ signal deriving from a student piano and a $\beta$ signal deriving from a teacher piano output, or a group amplifier. The lossy characteristic of the circuitry including the headphones, in addition to providing the advantages above recited, also provide isolation between lines and prevent cross-talk, eliminating any need for expensive electronic isolation circuits.

Another advantage of the system is that monitoring is unobtrusive, because switching occurs at high signal level but listening occurs at low signal level. For example, when the teacher switches in to monitor a given student, that student is unaware of the fact because he cannot hear a click when the appropriate switch is closed.

The ensemble mixing circuit is designed to assure that each student hears other individuals in the group at a somewhat lower level than he hears himself from his own amplifier circuit, much as he would in conventional piano groups because of relative proximity to the pianos. However the teacher hears all of the students at the same advantage, just as she would when normally distant from each individual conventional piano. This enables the student to hear himself better, and the teacher to judge ensemble balance.

The many 22KΩ resistances utilized in the system are not individually discussed nor provided with individual numerals of reference. These are the isolating resistances in signal mixing circuits at the inputs of group amplifiers. In each case, they supply a low current from a high impedance to a relatively lower impedance across the group amplifier input, and also serve to isolate incoming signal lines from each other. For example in the ensemble mixing circuit of FIG. 1A the signal from line $1\alpha$ comes through $S_1$ at position $d$ into 22K resistor 80 which is loaded by five parallel circuits to ground, each containing 22K and a dummy load of 4 ohms, efffecting a 5 to 1 voltage division. The same division occurs for signals from $2\alpha, \ldots 6\alpha$. The combined signals are amplified by group amplifier G and returned to the $\beta$ lines of the group.

In ensemble playing, the teacher has the option of becoming part of the ensemble, or not, as she chooses, and the students can speak to the teacher when she has selected the appropriate group button. Under this condition she cannot call any individual student but can speak to the class.

When the class switches 43 are actuated, any group of the class can be deleted by operating its RS switch to the $c$ position. This provides the ability to include any one, two or three groups in class instruction, the remaining students being in individual study. One or more groups of students can listen to a recording as they play, if the switches RS pertaining to their groups are set to the $a$ or $b$ positions. The teacher may now listen to individual student response to the recording by selecting the appropriate student button, or may listen to none by depressing the cancel button.

The four rotary four-position switches RS, in summary, each enables selection of any one of four facilities, programmed selectively to the four groups. The switches RS are therefore called "program switches". The four facilities which are selected according to rotary positions of the switches are:

a. Private practice, which can be monitored unobtrusively by the teacher, or private two-way communication and instruction at the discretion of the teacher. This facility permits the teacher to listen to any individual student, to the exclusion of all others, or to talk with that student, or to enable that student to listen to the playing of a passage by the teacher, according as ganged switches 35, 41 are in Listen Only position, or Instruct or Call positions. In the Instruct and Listen Only positions the switches 35, 41 lock in, but for the Call position the switch returns to Listen Only position when released.

The $a$ and $b$ positions of rotary switches RS serve to provide the students with music reproduced from either of two magnetic tapes (or disc records) called an "audio signal aid". In the $d$ position of the switches RS the students in a group may hear each other, the ensemble mode. They made also hear the teacher. If all four of switches RS are in the $d$ or ensemble position, each of the four groups can be instructed when the teacher depresses the appropriate group button 92, and all groups can be instructed when the class button 93 is actuated.

Group selection or class selection is accomplished by push buttons A, B, C, D, and 43, all of which are mutually exclusive. When an audio aid is selected for the group, actuation of the "cancel" switch maintains the audio aid for all the members of the group, but disconnects the teacher head-set circuit from individual members of the group, which otherwise would be selected by selective actuation of switches 70, numbered 1–6, inclusive, these being mutually exclusive in the sense that closure of any one switch assures that all others will be open. When the teacher performs group selection the audio aid signals may be monitored, the ensemble signal may be monitored, or individual students may be monitored, all within a selected group.

The Class selection mode, obtained by closing switch 43, enables the teacher to provide any or all groups with instruction simultaneously, but any group whose programming switch RS is set to individual will be excluded.

The teacher can thus set each of the four groups independently into any one of the four functions (three group and one individual), and can speak or play to any one selected group or none, simultaneously hearing what the selected group hears and, if desired, hear also a selected individual within the group selected.

Figure 1B:
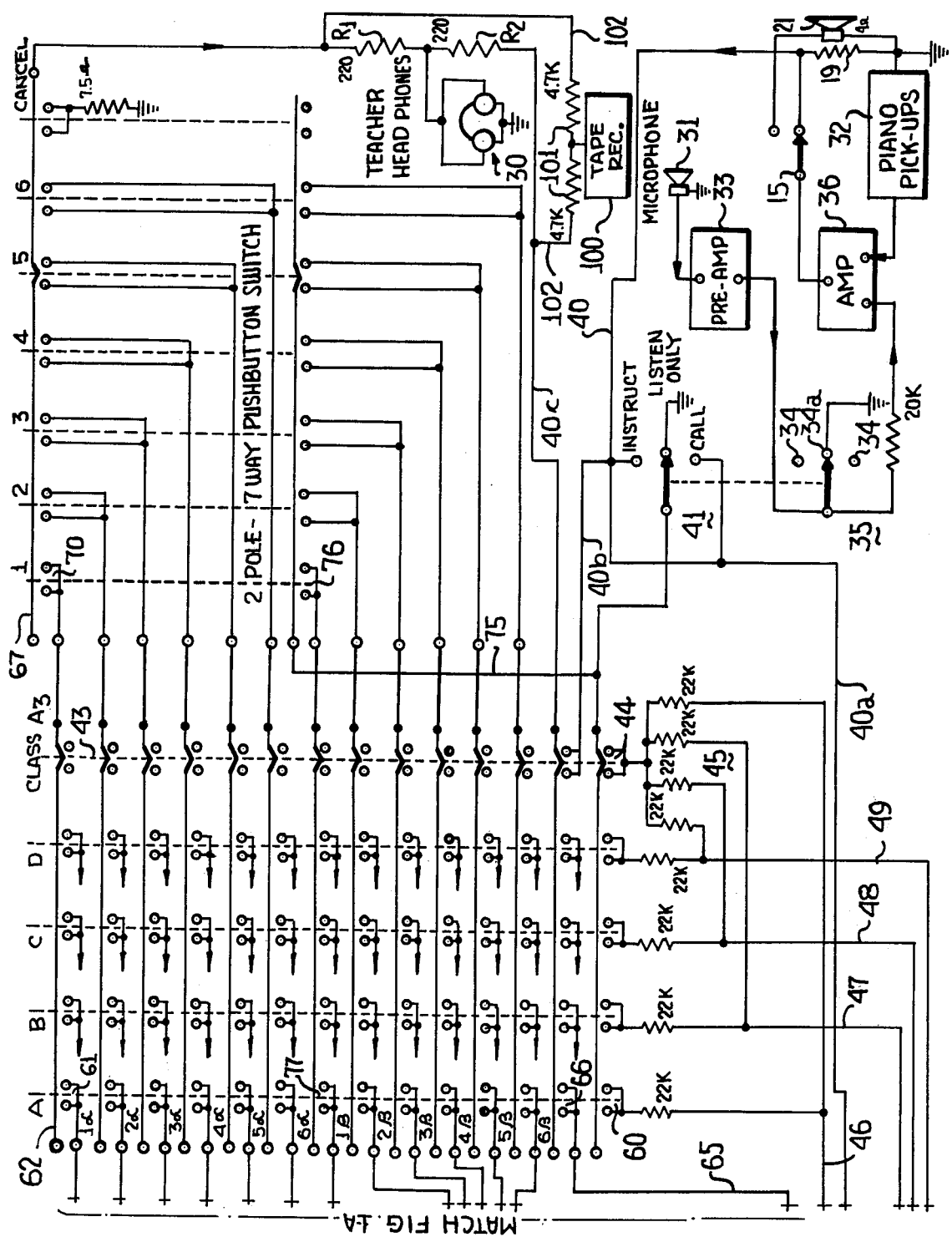
Figure 2:
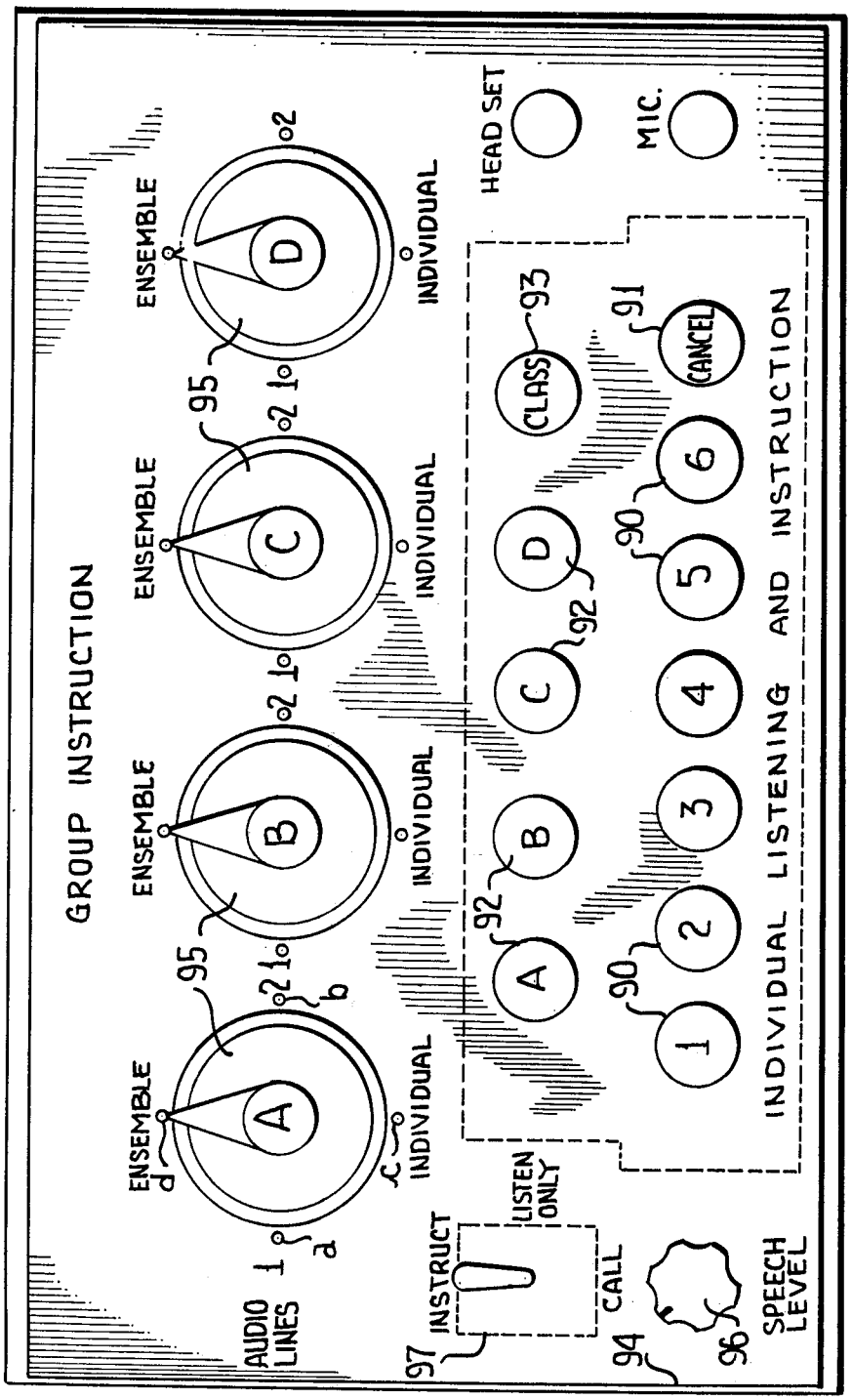
FIG. 2 is front view of a panel at a teacher's position, in the system of FIG. 1, showing the physical arrangement of controls.

In FIG. 1B is illustrated a tape recording facility 100 which is connected to the center point of two 4.7K resistances 101, across the resistances $R_1$, $R_2$ taken in series. The latter are 220Ω resistances. The connection of the tape recorder therefore does not appreciably affect the loudness of sound provided by the earphones 30, but anything heard in the earphones can also be recorded. The connecting lines 102 may also be utilized for connection to observers headphone circuits of the same type as for the teacher.

It will be appreciated that simplifications may be achieved in a system by having only six students, instead of for groups of six, and that this may be accomplished within the principles of the invention as defined in the appended claims.

We claim:
1. A system of intercommunication among (1) groups of members of a class or individual members of said class or the entire class with (2) a teacher station, comprising a group amplifier, a teacher station incoming line, an $n$ position rotary contact switch means having $m$ pairs of decks wherein $n$ is a number of stationary switch contacts and $m$ is one more than the number of members of one group, the groups all having equal numbers of members, wherein each individual member of said class is provided with an outgoing line and an incoming line, and wherein one of the rotary contacts of said pairs of said decks is connected directly to the input of said group amplifier the another to said teacher station incoming line, and the remainder of said rotary contact pairs are connected individually with said outgoing and incoming lines of the members.

2. The combination according to claim 1, wherein is provided means connected to corresponding ones of said stationary contacts for at will connecting all the incoming lines of a group of members to an isolative resistive mixer network.

3. The combination according to claim 2, wherein is provided a central station and means connected to said corresponding ones of said stationary contacts for at will connecting any selected individual incoming line to said central station to the exclusion of all other incoming lines.

4. In a teaching laboratory, an incoming teacher line, a teacher station including a teacher microphone for providing a source of electrical output signals, an outgoing teacher line connected to said microphone, relatively high isolating resistance connected between said incoming and outgoing lines, a relatively low input impedance tape recorder for receiving from said incoming line, a connection from said tape recorder to an intermediate point of said relatively high isolating resistance, a further relatively high isolating resistance being connected between said lines in parallel with said first relatively high resistance, and a headphone connected between a midpoint of said further relatively high resistance and ground, said headphone having relatively low resistance to further decouple said lines while providing a selected audible signal level to said headphone.

5. The combination according to claim 4, wherein is provided a plurality of pupil stations each including a signal source and a signal receiver connected respectively to an outgoing student line and an incoming student line, and means for selectively at will connecting said incoming student lines to said outgoing teacher line and said outgoing student lines to said incoming teacher line.

6. The combination according to claim 4, wherein said means for selectively at will connecting is a teacher actuated means.

7. In a teaching laboratory, an audio power amplifier having an input and an output, said output having a low source impedance and providing plural watts of power,
   a loudspeaker,
   switch means connecting said loudspeaker at will to said output,
   headphones having impedance of the order of 4 ohms, and
   a resistive network connectable by said switch means from said output to said headphones and including about 220 ohms connected in series between said output and said headphones,
   an outgoing audio line, a resistance of the order of the resistance of said loudspeaker connected between said outgoing line and ground,
   an incoming line,
   a second resistive network of about 220 ohms connected between said incoming line and said headphones.

8. In a teaching laboratory,
   an audio power amplifier having an input circuit and an output circuit, said output circuit having a low source impedance and providing plural watts of power,
   a loudspeaker,
   switch means connecting said loudspeaker at will to said output circuit,
   headphones having a predetermined low impedance,
   a relatively high impedance resistive network connectable by said switch means from said output circuit to said headphones and said resistive network including a resistance of at least 40 times that of said headphones,
   an outgoing audio line connected through said resistive network to said headphones,
   a relatively low impedance connected between said outgoing line and ground,
   an incoming line,
   a second relatively high resistive network connected between said incoming line and said headphone and having an impedance of the order of magnitude of said first resistive network.

* * * * *